(12) United States Patent
Allen et al.

(10) Patent No.: US 7,439,979 B1
(45) Date of Patent: Oct. 21, 2008

(54) SHADER WITH CACHE MEMORY

(75) Inventors: Roger L. Allen, San Jose, CA (US);
Chad D. Walker, San Jose, CA (US);
Rui M. Bestos, Porto Alegre (BR)

(73) Assignee: NVIDIA Corporation, Santa Clara, CA (US)

(*) Notice: Subject to any disclaimer, the term of this patent is extended or adjusted under 35 U.S.C. 154(b) by 477 days.

(21) Appl. No.: 10/985,285

(22) Filed: Nov. 10, 2004

(51) Int. Cl.
*G06T 1/20* (2006.01)
*G09G 5/36* (2006.01)

(52) U.S. Cl. ...................... 345/506; 345/557
(58) Field of Classification Search ............... None
See application file for complete search history.

(56) References Cited

U.S. PATENT DOCUMENTS

| | | | |
|---|---|---|---|
| 4,796,175 A * | 1/1989 | Matsuo et al. | 712/207 |
| 5,524,220 A * | 6/1996 | Verma et al. | 712/207 |
| 6,693,719 B1 * | 2/2004 | Gupta et al. | 358/1.15 |
| 6,731,296 B2 * | 5/2004 | Lewis et al. | 345/582 |
| 6,897,871 B1 * | 5/2005 | Morein et al. | 345/501 |
| 2002/0087832 A1 * | 7/2002 | Jarvis et al. | 712/206 |
| 2005/0251624 A1 * | 11/2005 | Brady et al. | 711/122 |

OTHER PUBLICATIONS

ATI, Radeon X800 3D Architecture White Paper, Apr. 2004.*
Hyde, Randall, The Art of Assembly Language, vol. 2, Chp. 6, Sect. 1-5, http://webster.cs.ucr.edu/AoA/Windows, Apr. 27, 2004.*

* cited by examiner

*Primary Examiner*—Kee M. Tung
*Assistant Examiner*—Aaron M Richer
(74) *Attorney, Agent, or Firm*—Patterson & Sheridan, LLP

(57) ABSTRACT

A shader having a cache memory for storing program instructions is described. The cache memory beneficially stores both current programming instructions for a fragment program being run and "look-ahead" programming instructions. The cache memory supports a scheduler that forms program commands that control programmable processing stations. The cache memory can store multiple programming instructions for a plurality of shaders. If the cache memory does not include the desired programming instructions, a miss is asserted and a scheduler (instruction processor) recovers the programming instructions to be run. Beneficially, the scheduler recovers additional programming instructions to support the look-ahead programming. The cache memory stores program instructions by cachelines, where each cacheline comprises a plurality of programming instructions. The cache memory can also store program identifiers.

10 Claims, 6 Drawing Sheets

SHADER WITH CACHE MEMORY

BACKGROUND OF THE INVENTION

1. Field of the Invention

The present invention relates to computer systems, and more particularly to computer shading.

2. Description of the Related Art

Graphics processing is an important feature of modern high-performance computing systems. In graphic processing, mathematical procedures are implemented to render, or draw, graphic primitives, e.g., a triangle or a rectangle, on a display to produce desired visual images. Real time graphics processing is based on the high-speed processing of graphic primitives to produce visually pleasing moving images.

Early graphic systems were limited to displaying image objects comprised of graphic primitives having smooth surfaces. That is, visual textures, bumps, scratches, or other surface features were not modeled in the graphics primitives. To enhance image quality, texture mapping of real world attributes was introduced. In general, texture mapping is the mapping of an image onto a graphic primitive surface to create the appearance of a complex image without the high computational costs associated with rendering actual three dimensional details of an object.

Graphics processing is typically performed using application program interfaces (API's) that provide a standard software interface that can be run on multiple platforms, operating systems; and hardware. Examples of API's include the Open Graphics Library (OpenGL®) and D3D™. In general, such open application programs include a predetermined, standardized set of commands that are executed by associated hardware. For example, in a computer system that supports the OpenGL® standard, the operating system and any application software programs can make calls according to that standard without knowing any of the specifics regarding the system hardware. Application writers can use APIs to design the visual aspects of their applications without concern as to how their commands will be implemented.

APIs are particularly beneficial when they are supported by dedicated hardware. In fact, high-speed processing of graphical images is often performed using special graphics processing units (GPUs) that are fabricated on semiconductor substrates. Beneficially, a GPU can be designed and used to rapidly and accurately process commands with little impact on other system resources.

FIG. 1 illustrates a simplified block diagram of a graphics system 100 that includes a graphics processing unit 102. As shown, that graphics processing unit 102 has a host interface/front end 104. The host interface/front end 104 receives raw graphics data from a central processing unit 103 that is running an application program stored in memory 105. The host interface/front end 104 buffers input information and supplies that information to a geometry engine 106. The geometry engine has access to a frame buffer memory 120 via a frame buffer interface 116. The geometry engine 106 produces, scales, rotates, and projects three-dimensional vertices of graphics primitives in "model" coordinates that are stored in the frame buffer memory 120 into two-dimensional framebuffer co-ordinates. Typically, triangles are used as graphics primitives for three-dimensional objects, but rectangles are often used for 2-dimensional objects (such as text displays).

The two-dimensional frame-buffer co-ordinates of the vertices of the graphics primitives from the geometry engine 106 are applied to a rasterizer 108. The rasterizer 108 identifies the positions of all of the pixels within the graphics primitives. This is typically performed along raster (horizontal) lines that extend between the lines that define the graphics primitives. The output of the rasterizer 108 is referred to as rasterized pixel data.

The rasterized pixel data are applied to a shader 110 that processes input data (code, position, texture, conditions, constants, etc) using a shader program (sequence of instructions) to generate output data. While shaders are described in relation to their applications in graphics processing, shaders are, in general, useful for other functions. Shaders can be considered as a collection of processing capabilities that can handle large amounts of data at the same time, such as by parallel handling of data.

The shader 110 includes a texture engine 112 that modifies the rasterized pixel data to have the desired texture and optical features. The texture engine 112, has access to the data stored in the frame buffer memory 120 via the frame buffer interface 116. The shaded pixel data is sent to a Raster Operations Processor 114 (Raster op in FIG. 1) that optionally performs additional processing on the shaded pixel data. The result is pixel data that is stored in the frame buffer memory 120 by the frame buffer interface 116. The frame pixel data can be used for various processes such as being displayed on a display 122.

Hardwired pipeline shaders 110 are known. For example, hardwired pixel pipelines have been used to perform standard API functions, including such functions as scissor, Alpha test; zbuffer, stencil, blendfunction; logicop; dither; and writemask. Also known are programmable shaders 110 that enable an application writer to control shader processing operations.

Programmable shaders enable flexibility in the achievable visual effects and can reduce the time between a graphics function being available and that function becoming standardized as part of a graphics API. Programmable shaders can have a standard API mode in which standard graphics API commands are implemented and a non-standard mode in which new graphics features can be programmed.

While shaders have proven themselves to be useful, demands for enhanced shader performance have exceeded the capabilities of existing shaders. While improving existing shaders could address some of the demands, such improvements would be difficult to implement. One nearly constant demand is faster performance. Graphical processing speed is often limited by just how fast the shader 110 can process pixels. Furthermore, additional future demands can be anticipated.

In the prior art, shader programming was performed by acquiring programming instructions from the frame buffer memory (or from some other main memory) each time the shader 110 was used. This involved accessing the frame buffer memory 120 (or some other main memory) possibly through texture 112 to acquire the programming instructions and then subsequently programming the shader stations of the shader engine 110 before each data run. Unfortunately, acquiring programming instructions involves a significant time delay. A request to obtain the programming instructions had to be formed, moved through the system, applied to the frame buffer memory 120, the programming instructions had to be obtained, moved back through the system to the texture engine, formatted into programming instructions, and then, finally used to program the various shader stations.

Therefore, a new type of programmable shader would be beneficial. Even more beneficial would be a new type of programmable shader having faster performance. Avoiding the need to acquire programming instructions from a main memory before each data processing run would be particularly helpful. Look-ahead programming instruction acquisition would also be beneficial.

SUMMARY OF THE INVENTION

The principles of the present invention provide for a new, useful, and non-obvious programmable shader. Embodiments of the present invention include programmable shaders that have a cache memory that stores both current programming instructions and, beneficially, "look-ahead" programming instructions.

Some embodiments of the present invention incorporate a programmable shader having programmable processing stations that include a plurality of texture stations. A cache memory stores programming instructions that have been or that may be used to program the processing stations. A scheduler (instruction processor) uses the program instructions in the cache memory to form programming commands (such as a very long instruction word or VLIW) that programs the individual processing stations. If the cache memory does not include the desired programming instructions, a miss is asserted by the cache memory. In response to a miss, the scheduler recovers the next N+N programming instructions (where N is an integer related to the programmability of the shader), applies the recovered N+N programming instructions to the cache memory, and forms a programming word from the first N programming instructions.

Shaders having multiple shader pipelines, each of which including programmable processing stations, are in full accord with the principles of the present invention. In the case of multiple shader pipelines, a scheduler (or schedulers) programs each shader pipeline's processing stations, and the cache memory stores both current and look-ahead programming instructions for each processing station. Program instructions can be recalled from the cache memory by the scheduler, formed into programming commands, and applied to each shader pipeline to program its processing stations.

A shader can include a scheduler and cache memory that also stores identification information for each of the shader pipelines. Additionally, the cache memory can store program instructions by cachelines, wherein each cacheline comprises a plurality of programming instructions that are to be implemented by a particular shader pipeline. Cachelines can be formed for the current programming instructions and for the next set of programming instructions that are likely to be used by each of the shader pipelines.

BRIEF DESCRIPTION OF THE DRAWINGS

The foregoing and other aspects and advantages are better understood from the following detailed description of a preferred embodiment of the invention with reference to the drawings, in which.

DETAILED DESCRIPTION

Figure 1:
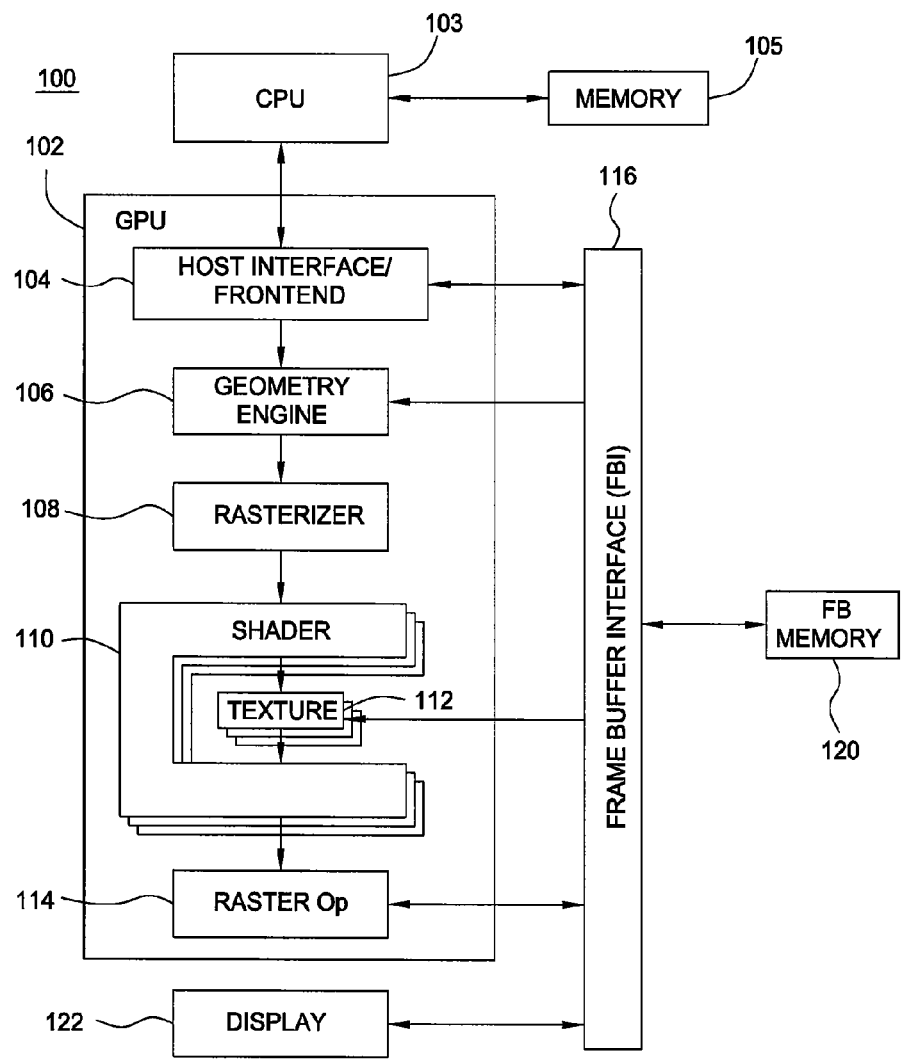
FIG. 1 schematically illustrates a graphics system.

The principles of the present invention provide for new, useful, and non-obvious programmable fragment shaders that include a cache memory. Those principles further provide for a programmable fragment shader having multiple shader pipelines, each with a plurality of programmable processing stations, which can be programmed by a scheduler (instruction processor) that uses a cache memory to store programming instructions. Beneficially, the scheduler attempts to obtain required programming instructions from the cache memory when forming program commands that will be applied to program the processing stations. If a miss occurs, such as when the cache memory does not contain the required programming instructions, the scheduler obtains the required programming instructions from a frame buffer memory (main memory) along with additional "look-ahead" programming instructions, all of which are stored in the cache memory. The processing stations of each shader pipeline can be programmed to execute a distinct set of program instructions that include branching, processing, and mathematical operations using floating-point, fixed-point, and/or integer values.

To better understand the principles of the present invention it may be helpful to understand graphical processing in more detail. Referring back to FIG. 1, the inputs to a shader 110 include two-dimensional display co-ordinates of the vertices of the graphics primitives used in the graphics system. Furthermore, the texture engine 112 has access to data, including programming instructions, in the frame buffer 120. Typically, but not always, the graphic primitives are triangles. For example, FIG. 2A illustrates the coordinates (0,0), (1,0), and (1,1) of the vertices that define a graphic primitive triangle 202. If rectangles are used, the additional coordinate (0,1) would be included in the graphics primitive. However, except for two-dimensional objects such as text, triangles are more common.

Figure 2A:
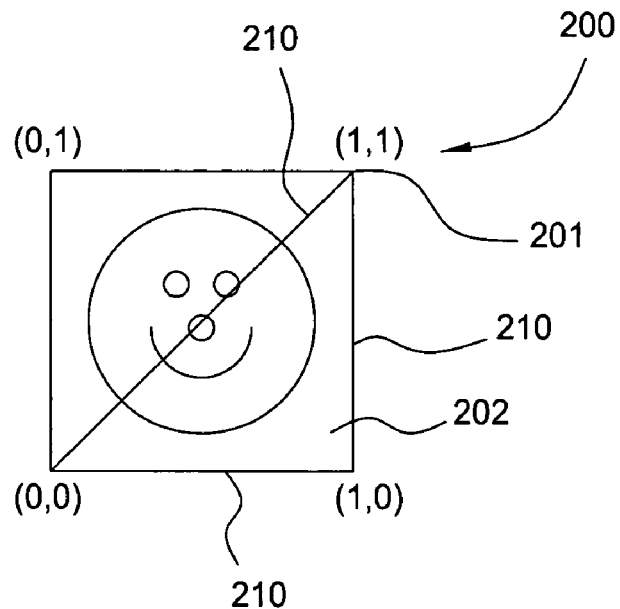
FIG. 2A schematically illustrates a triangle geometric primitive.
Figure 2B:
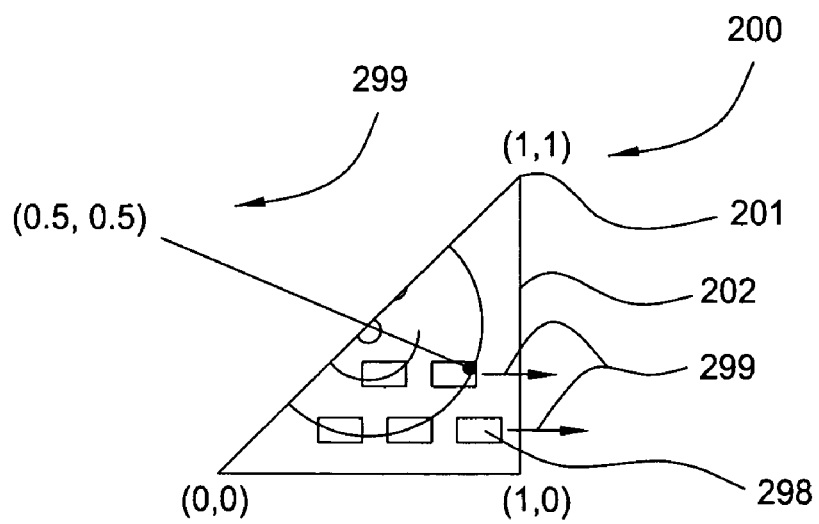
FIG. 2B illustrates a triangle geometric primitive having pixels aligned along each scan line.

Once the vertices 201 of the triangle 202 are known, the pixels within the graphical primitive are determined since they are the pixels located between the lines 210 that form the graphic primitive. Usually the pixels are organized along raster scan lines. For example, FIG. 2B illustrates a plurality of pixels 298 within the triangle 202 that are aligned by scan lines 299.

Figure 3:
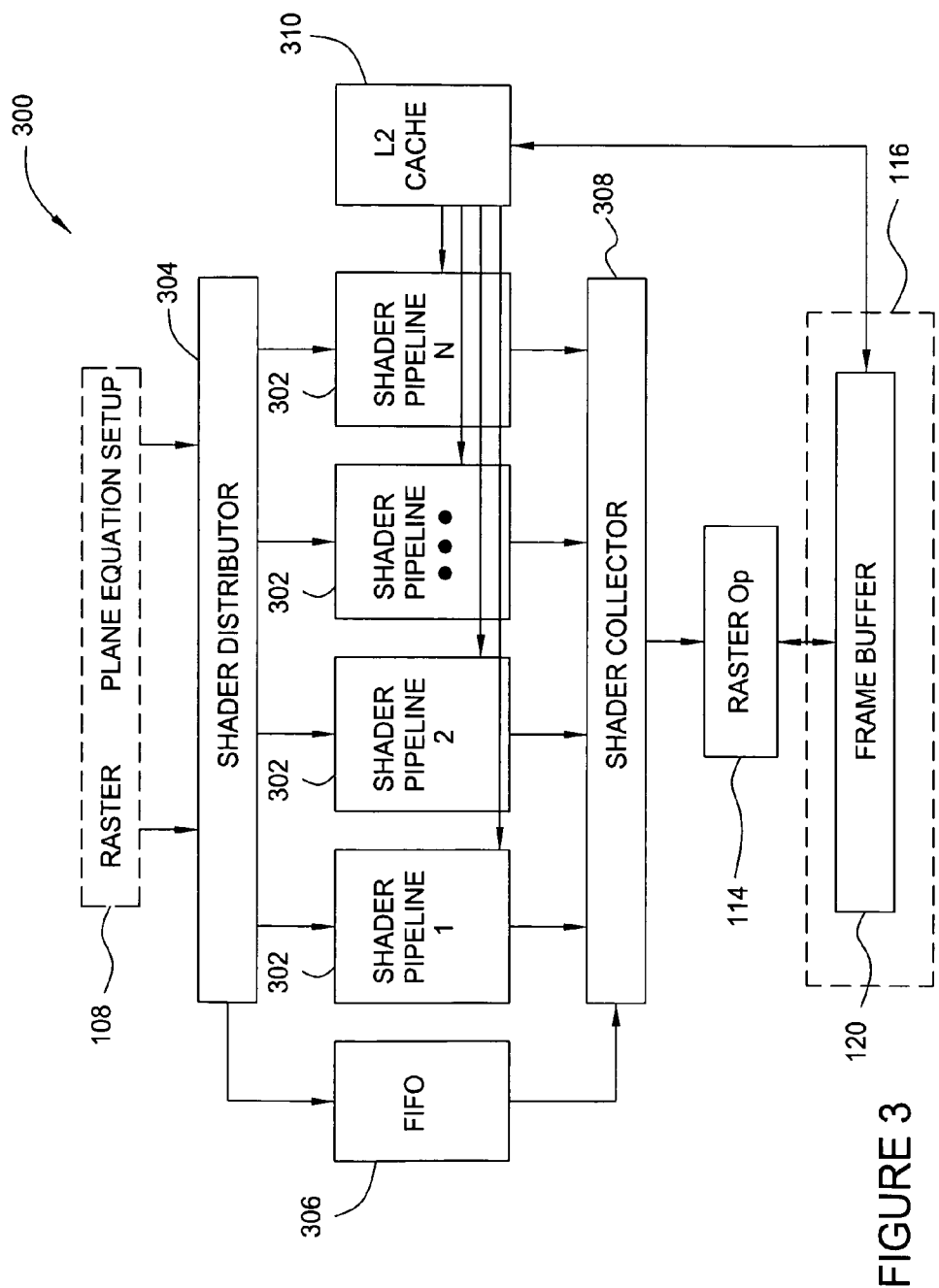
FIG. 3 is a high-level block diagram of a shader architecture having multiple shader pipelines and that is in accord with the principles of the present invention.

FIG. 3 is a high-level block diagram of a programmable fragment shader 300 having features that are in accord with the principles of the present invention. The fragment shader 300 represents a new, useful, and unobvious embodiment of a generic fragment shader 110 shown in FIG. 1. The fragment shader 300 converts the rasterized pixel data (which has raw X, Y per fragment and plane equations for per-vertex attributes such as color, depth, texture, coordinates, etc) from the rasterizer 108 into appropriate color and depth values for each pixel that is to be sent to the frame buffer. To do so, the fragment shader 300 executes large numbers of operations to resolve mathematical equations in response to API functions and in response to application program instructions to produce the desired color and depth values to form shaded pixel data. A copy of the application program instructions is typically stored in the frame buffer memory. Because there may be numerous application program instructions, and because the fragment shader 300 has limited programmability, the application program instructions are fetched from the frame buffer memory 120 and stored in a cache memory in a manner that is described in more detail subsequently. After additional processing by the Raster Operations Processor 114, the shaded pixel data is converted into frame pixel data that is stored by the frame buffer interface 116 in the frame memory 120 (reference FIG. 1).

A notable feature of the fragment shader 300 is its multiple shader pipelines 302. Each shader pipeline 302 can be individually programmed to perform mathematical and other processing operations on rasterized pixel data to produce shaded pixel data. While the fragment shader 300 is shown as having four shader pipelines 302, there could, in general, be from 1 to N shader pipelines 302, where N is an integer. This scalability can be used to control shader processing power by simply adding/subtracting shader pipelines. Furthermore, such scalability enables shader pipeline 302 redundancies, which, in turn, enables the ability to functionally disable defective shader pipelines 302, while still maintaining the overall operation of the fragment shader 300.

The fragment shader 300 also includes a shader distributor 304. One function of the shader distributor 304 is to distribute information from the rasterizer 108 (rasterized pixel data) to the various shader pipelines 302 so that they may process the rasterized pixel data in accord with programming instructions. Beneficially this distribution is performed in a manner that provides for a balanced workload between the fragment shader pipelines 302. That is, each shader pipeline 302 performs similar amounts of processing and none is preferred over the others. Another function of the shader distributor 304 is to process the data from the rasterizer 108 such that the shader pipelines 302 only receive what they require.

A portion of control data, referred to as state data, that is not used by the shader pipelines 302 is applied by the shader distributor 304 to a first in/first out buffer memory 306. Besides state data, the first in/first out buffer memory 306 also receives X-Y coordinate and pixel coverage data, which also do not go through the shader pipelines 302.

Because the shader pipelines 302 independently process rasterized pixel data, the outputs of the shader pipelines 302 have to be organized in such a manner that the resulting processed pixel data is properly matched with the pixels in the frame buffer (by raster scan lines). The shader 300 therefore includes a shader collector 308 that receives the outputs of the shader pipelines 302 and the outputs of the first in/first out buffer memory 306, and that organizes the results of the shader operations to produce shaded pixel data for the Raster Operations Processor 114 (ROP).

The output of the shader collector 308 is applied via the frame buffer interface 116 to the frame buffer memory 120, and thus to the display 122 or to other processes. Since the shader pipelines 302 can all request data from the frame buffer memory (through texture requests as described subsequently), the fragment shader 300 includes an L2 cache memory 310 to assist in that process. It is through the texture requests that program instructions can be obtained from the frame buffer memory.

Figure 4:
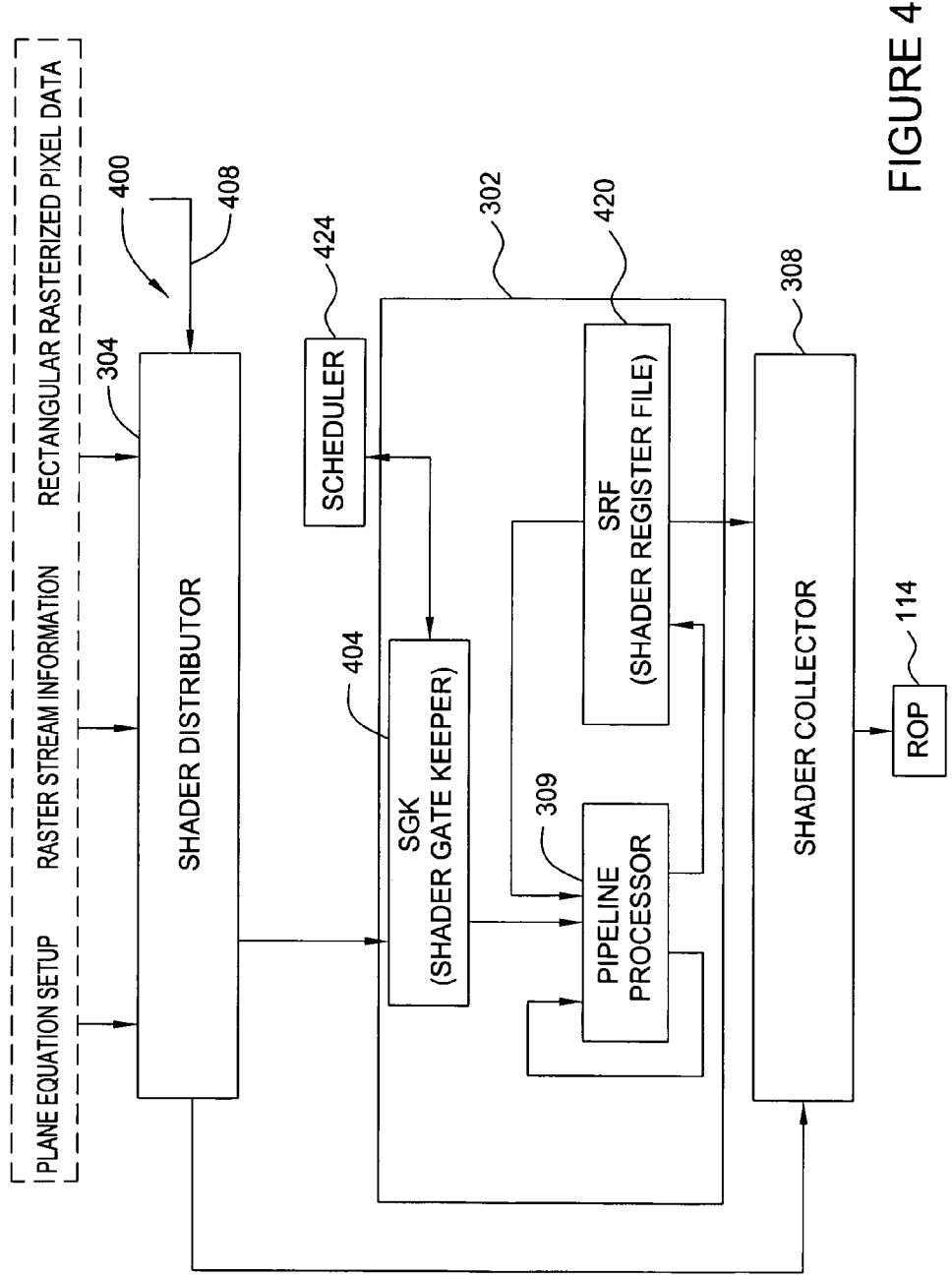
FIG. 4 is a lower-level block diagram of the shader shown in FIG. 3, but with only one (of several) shader pipeline shown.

With the foregoing overview of the fragment shader 300, a more detailed introduction to features of the fragment shader 300 and how it is programmed may assist understanding the principles of the present invention. As shown in FIG. 4, the shader distributor 304 receives information from the rasterizer 108, and then distributes raster stream information and rectangular raster stream information to shader gate keepers 404 (described in more detail subsequently) within the shader pipelines 302. Information from the rasterizer 108 is in two main formats, triangle plane equation information, shown as plane equation set-up, and triangle rasterized pixel data in the form of raster stream information. Additionally, since the shader 300 also handles 2-dimensional information which is input with reference to rectangular geometric primitives, the shader distributor 304 also receives rectangular rasterized pixel data.

A main function of the shader distributor 304 is to distribute the triangle plane equation information and the raster stream information to the individual shader pipelines 302, beneficially in a manner that balances the shader pipeline workloads between the available shader pipelines 302. Distributing data to the shader pipelines 302 is performed in two phases: segmentation and distribution. Because a shader pipeline 302 can perform operations only on a limited number of pixels at a time, the incoming data is chopped into groups called "segments." Segmentation is the process of forming segments. There are actually multiple reasons to segment, load-balancing being one, and workload size limitations being another. The number of pixels that can be handled by a single shader pipeline 302 is also limited by memory storage capacities of a shader register file (RAM) 420 and of the shader gatekeeper 404 itself, as well as the need to send programming instructions down the shader pipelines 302 (as is explained in more detail subsequently).

Distribution is the process of choosing one of the shader pipelines 302 and then feeding that shader pipeline 302 a complete segment, then feeding the next segment to the next shader pipeline 302, and so on. In the fragment shader 300 (see FIG. 3), the segment distribution sequence is a simple round robin assignment between the operable shader pipelines 302. For instance if there are 4 shader pipelines 302 but only three are operable, then the distribution sequence is between the three operable shader pipelines 302. The first segment would go to shader pipeline 0, then to the next segment to shader pipeline 1, then to the next to shader pipelines 2, and then back to shader pipeline 0 and so on.

The shader gatekeeper 404 receives segments and triangle equation information from the shader distributor 304. The shader gatekeeper 404 also receives program commands from a scheduler 404, which is described in more detail subsequently. The shader gate keeper 404 passes program commands and incoming segment data to a pipeline processor 309, also described in more detail subsequently. The pipeline processor 309 processes the segment data in line with the program commands. Temporary storage and output buffering is provided by the shader register file 420.

After shaded pixel data has been processed, the shader collector 308 collects the shaded pixel data from the shader register file of the shader pipelines 302 and combines that data with X, Y, and coverage data from the first in/first out buffer memory 306 (see FIG. 3) to form an organized shader pixel data packet. As noted previously, the resulting data is sent to a Raster Operations Processor 114 that performs additional processing.

In some embodiments of the present invention the shader distributor 304 has functionality related to the initial programming of the first N (say 8) programming instructions. In such embodiments, the initial programming instructions pass to the scheduler 424 (as described below) which then forms program commands for the shader pipeline processing stations (described subsequently). After the initial programming, or in embodiments in which the shader distributor 304 does not send initial program instructions, the scheduler 424 obtains the remaining (or all) programming instructions, forms programming commands, and applies them to the shader gatekeepers 404. Since the scheduler 424 must coordinate the application of programming commands with the application of segments to the shader gatekeepers 404, the scheduler 424 is functionally in communication with the shader distributor 304. This is beneficial because in multiple pipeline shaders 300 each shader pipeline 302 must be individually programmed, which means the scheduler 424 must track which shader pipeline 302 is running which set of instructions.

Referring now to FIGS. 1 and 3, a copy of all program instructions are beneficially stored in the frame buffer memory 120. To program a shader pipeline 302, the program instructions are applied as VLIWs: small programs that implement subsets of the complete program. VLIWs are used because the program instructions in the frame buffer memory 120 may not be in the proper format to implement the intended operations, which require allocating and mapping program instructions to pipeline resources, and because a program will usually be too large to be directly applied to a shader pipeline 302 because a shader pipeline 302 has limited resources.

To run a fragment program that processes graphics, very large instruction words (VLIW) are formed by sequentially taking N, say 8, of the program instructions at a time, converting them into a corresponding VLIW, and then applying that VLIW as a programming command to a shader pipeline 302. The programming command then programs the shader pipeline processing stations. A segment is then input and processed in accord with the VLIW. After the segment has been processed in accord with the first N (8) instructions, another N (8) instructions are obtained, another VLIW if formed, the shader pipeline is re-programmed, and the segment is processed in accord with the new VLIW. The process repeats until a segment has been fully processed in accord with all the programming instructions. A program counter tracks the program execution steps.

Figure 5:
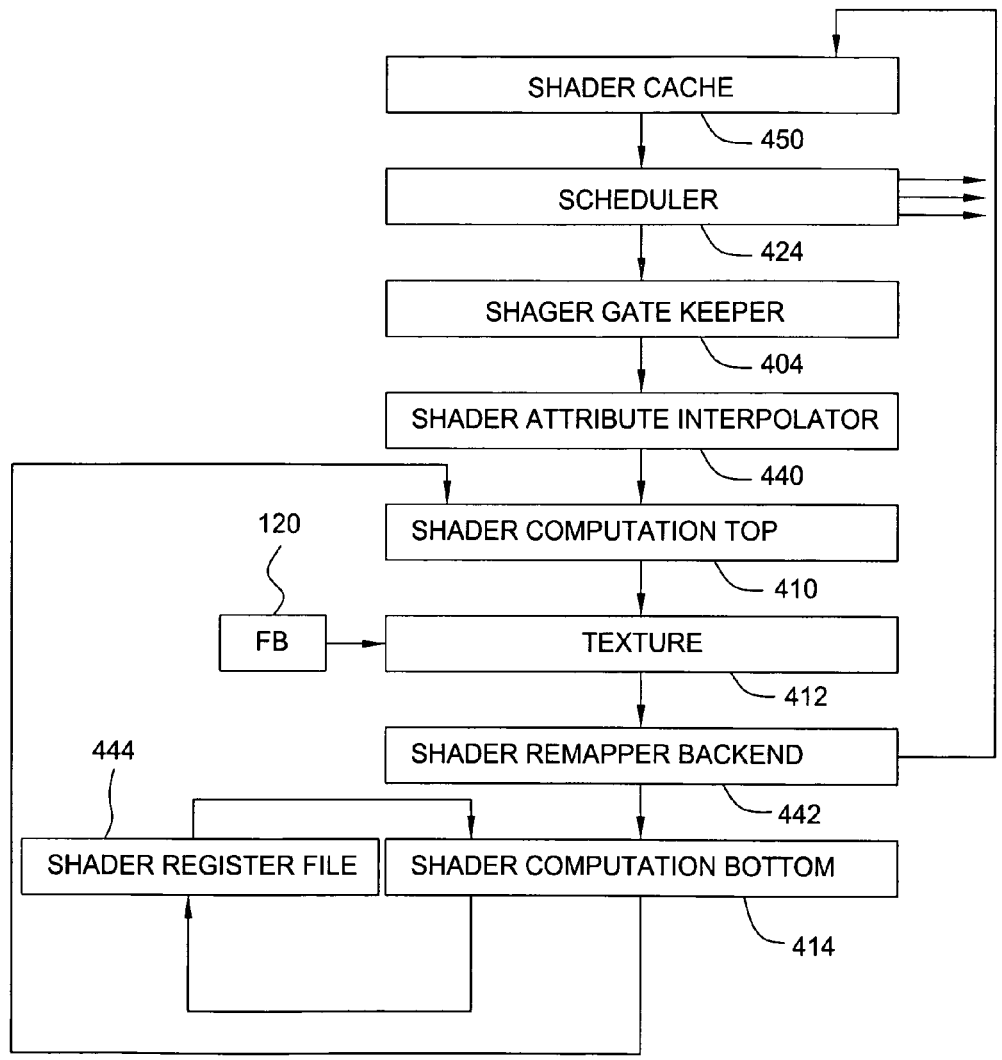
FIG. 5 is a lower-level block diagram of the shader shown in FIGS. 3 and 4, and which illustrates selected architectural features.

Having been provided with an overview of the shader architecture (FIG. 3), with more detail regarding interactions of main features of the shader 300 (FIG. 4), and with an overview of shader pipeline programming, FIG. 5 will help explain programming and the use of a cache memory.

Turning now to FIG. 5, as previously indicated shader pipeline programming is performed using programming commands that take the form of a word, referred to as a very long instruction word, or VLIW. The scheduler 424 forms and sends each shader pipeline 302 VLIW microcode instructions for each segment pass through the shader pipeline 302. The VLIW is applied to the shader gatekeeper 404, which passes that VLIW to a shader attribute interpolator 440, which passes it on to the various programmable processing stations that are described below. It should be noted that a given shader pipeline 302 can be programmed with only one VLIW at a time, but that individual pipelines 302 can run a different VLIW on different segments.

As noted, the shader pipelines 302 are configured such that a VLIW can program its processing stations to perform various tasks. The various processing stations have specific functions that they can be programmed to perform. The ordering of programming functions is the task of a compiler (or interpreter) that compiles (or interprets) a graphical program in accord with the limitations and the organization of the shader pipeline 302. An incoming VLIW is recognized as a program command, and not a segment, by the use of a program flag bit. An incoming VLIW is parsed by the programmable processing stations to isolate the command instructions that control their specific operations.

Referring to FIG. 5, the programmable processing stations include a shader computation top 410, a texture unit 412 and its shader re-mapper backend 442, and a shader computation bottom 414. Looping can occur from the shader computation bottom 414 to the shader computation top 410 to enable multiple processing passes through the processing stations.

The main responsibility of the shader computation top 410 is perspective correction of interpolated attributes incoming from a shader attribute interpolator 440. Such perspective correction demands reciprocation of 1/w (or q/w), to produce w (or w/q), followed by multiplication of the scalar interpolated attribute by w (or w/q). The shader computation top 410 can also perform various operations such as the scalar-reciprocation operation (RCP) and the 4-component multiplication operations MULR or MULH.

The texture unit 412 acts as a read-in port from the frame buffer memory 120. The texture unit 412 performs texture lookups from the frame buffer 120, which include accessing stored graphical programming instructions. Those results are remapped, if required, into proper form (16 or 32 bit floating point) for subsequent operations by the Shader Re-mapper and Backend 442. The properly formatted values are made available to a Shader Register File (SRF) 444 (via the shader computation bottom 414) and to the shader computation bottom 414. The texture unit 412 and the Shader Re-mapper and Backend 442 can execute all unpack (UP*) instructions, the optimized NRM instruction, and can compute the fog fraction. The texture unit 412 and the Shader Re-mapper and Backend 442 support execution of two separate instructions in parallel if one instruction is a texture, unpack, DDX, or DDY instruction, and the other is the other is the NRM instruction. The shader computation top and bottom 414 performs various graphic processing functions in accord with the programming instructions they receive from the current VLIW.

As shown in FIG. 5, the shader register file 444 is in communication with the scheduler 424, and the texture unit 412 is in communication with the frame buffer memory 120. Programming instructions from the frame buffer memory 120 are accessed by the texture unit 412, passed to the shader cache 450 via the shader remapper and backend 442, and from there the accessed programming instructions are accessed by the scheduler 424.

Programmable shaders utilizing a single pipeline were known in the prior art. In the prior art, each time data was to be processed by a shader, a scheduler of some type would obtain a set of program instructions from a main memory. That scheduler would form programming commands and apply them to the shader's texture stations. Obtaining program instructions from main memory was performed every time data was to be processed. That significantly slowed down system operation. The principles of the present invention reduce this program acquisition slowdown by incorporating a cache memory 450.

Figure 6:
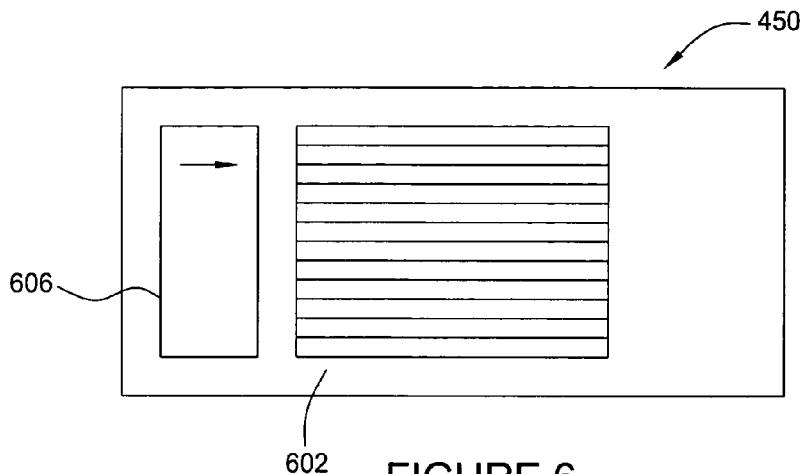
FIG. 6 illustrates the organization of a cache memory used in the shader shown in FIGS. 3-5.

FIG. 6 illustrates one embodiment of the cache memory 450. The cache memory 450 includes 8-cacheline registers 602 and a content addressable memory 606. The cache memory 450 is beneficially a fully associative cache having a cacheline register size of 256 bytes each. Each cacheline register stores a set of 8 program instructions, either for the current portion of the current fragment program or for the next portion of the same program that is likely to be used. Since the shader 300 has four shader pipelines 302, 8 cacheline registers are required in order for the cache to store both current and look-ahead portions of up to four separate fragment programs. The use of the content addressable memory is described subsequently.

At some initial time, the scheduler 424 needs program instructions to form a VLIW that will program the processing stations of a particular shader pipeline 302. To obtain those program instructions the scheduler 424 sends a VLIW programming word that commands recall of the first N program instructions, where N is an integer that corresponds to the number of instructions that can be stored in a single cacheline. Since most graphical programs generally operate sequentially, the next most likely set of program instructions are the program instructions that follow the ones being run.

That VLIW word is passed down through the shader gatekeeper 404, through the shader attribute interpolator 440, through the shader computation top 410, and to the texture unit 412. The texture unit 412 is programmed by the VLIW word to obtain the next instructions from the frame buffer memory 120. It should be noted that the scheduler 424 maintains a program counter that tracks the location of the last program instruction accessed from the shader cache. After the initial access by the texture unit 412 the program counter is set at N. The texture unit 412 recovers the next N program instructions from the frame buffer memory 120, and passes them under the control of the initial VLIW word through the shader re-mapper 442. From there the 2N program instructions pass into the shader cache 450 where they are accessed by the scheduler 424.

The scheduler 424 causes the 2N program instructions to be stored in the cache memory 450 cacheline registers 602, the first N program instructions go into the current cacheline for the shader 300 being programmed and the next N program instructions go into the cacheline registers 602 for the next most likely cacheline for the shader 300 being programmed. The scheduler 424 also forms a VLIW word that will program the shader pipeline 302 to perform the instructions represented by the first N programming instructions.

After the scheduler 424 has formed the VLIW word for the shader pipeling 300 being programmed, that VLIW word is applied to that shader's shader gatekeeper 404. The VLIW word is accepted, is clocked down through the shader pipeline processing stations, and programs them in accord with the program instructions. The shader gatekeeper 404 then accepts a segment and processes it in accord with the VLIW word.

Upon completion of segment processing, the scheduler 424 queries the cache memory 450 for the next set of program instructions by sending a cache request. Since the cache memory 450 has received and stored those next N instructions in a cacheline, that cache memory 450 sends those instructions, which are in a cacheline register 602 for the next most likely VLIW, to the scheduler 424. The scheduler 424 formats a new VLIW word and applies it to the shader gatekeeper 424, which passes it through the processing stations and segment processing begins again.

The foregoing process is repeated until the scheduler 424 requests a set of cacheline program instructions that is not in the cache memory 450. When that occurs, the cache memory 450 signals a miss. The scheduler 424 then forms another VLIW word to obtain the next 2N program instructions from the frame buffer memory 120 in the same manner as previously described. Once again, the scheduler 424 causes the cache memory 450 to store recovered program instructions, both for the current program instructions that are to be performed and for the next most likely set of program instructions.

It should be noted that the cache memory 450 is beneficially fully associative. That is, any program fragment in a cacheline register 602 can be recalled when forming any VLIW word. For example, if a first shader pipeline 302 is processing a segment in accord with a first VLIW, and if another pipeline 302 is going to run another segment using that VLIW, the scheduler 424 can obtain the current VLIW used to program the first pipeline 302 and use it to program the other pipeline 302. Thus, if four shader pipelines 302 are to run the same VLIW on four different segments, the scheduler 424 only needs to obtain the program instructions for the VLIW once from the frame buffer memory. This avoids consuming texture bandwidth and actual processing clocks in a shader pipeline to obtain instructions, which noticeably improves performance.

The cache memory 450 also stores a program identifier for each cacheline register 602 within the content addressable memory 606. That program identifier tracks which shader pipelines 302 are running, or probably will run, the instructions in each cacheline. The content addressable memory 606 supports the parallel lookups required in a fully associative cache. The content addressable memory 606 is split into two portions to allow the identification of both a specific portion of a given program as well as to identify all instructions for a given program ID.

The interaction of the cache memory 450 and the scheduler 424 is direct. When the scheduler 424 wants to form a VLIW, it interrogates the cache memory 450 seeking the next set of N instructions. If those N instructions were available anywhere in the cache memory 450, those instructions are applied to the scheduler 424, which then forms the VLIW which is passed to a shader pipeline's processing stations to program them in accord with the VLIW. However, if the scheduler 424 requests information not in the cache memory 450, the cache memory 450 so notifies the scheduler. The scheduler 424 then causes the texture unit 412 to obtain the next N group programming instructions. That N group includes a look-ahead instruction such that the next most likely cache line will be made available in the cache line memory 450. The next set of instructions are obtained through the shader remapper backend 442, which causes the current and the next most likely cache line for the given pipeline to be stored in the cache line 450.

Figure 7:
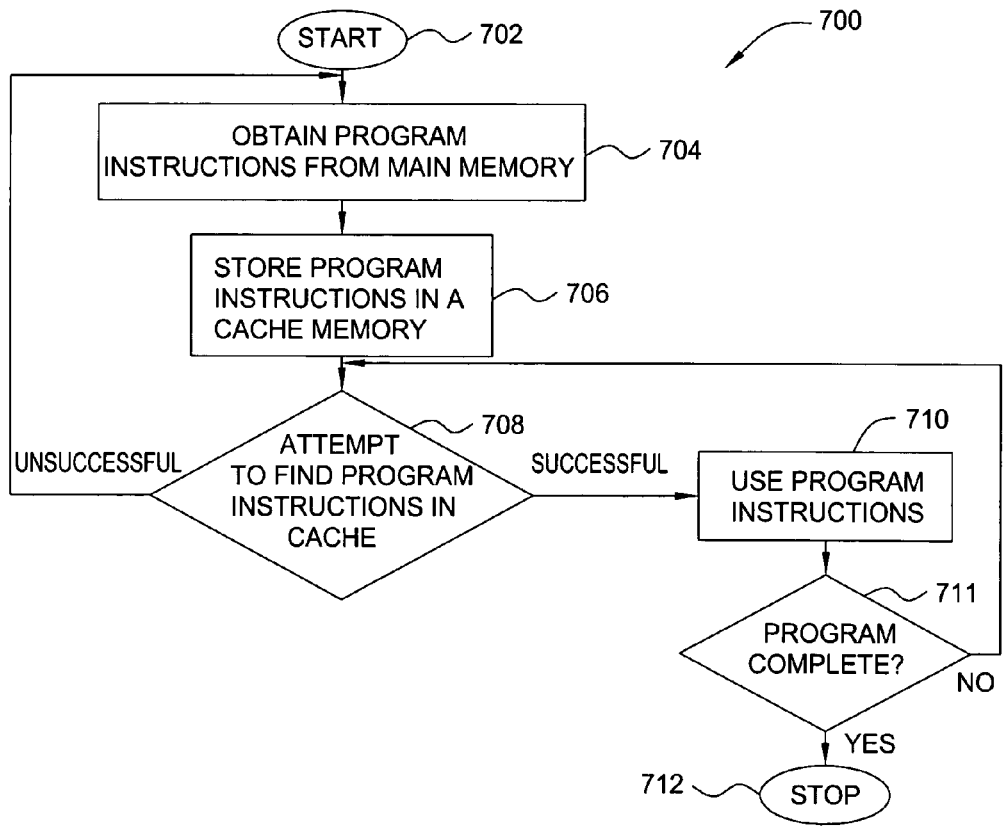
FIG. 7 illustrates steps of programming shader pipeline processing stations.

FIG. 7 illustrates a method 700 of using the cache memory 450. The method 700 starts at step 702 and proceeds at step 704 by the scheduler 424 obtaining program instructions from the frame buffer memory 120. Then, at step 706 those program instructions are stored in the cache memory 450. Later, at step 708 the scheduler 424 attempts to find program instructions in the cache memory 450. If successful, at step 710 the scheduler 424 uses the obtained program instructions to form a VLIW and the method stops at step 712. However, if at step 708 the attempt was unsuccessful, a loop is made back to step 704 where program instructions are obtained from main memory. Preferably, more programming instructions are recalled and stored in cache memory then can be used in a VLIW word. This enables look-ahead operations.

While the foregoing has described using a VLIW to initiate a fetch of instructions from memory into the shader cache 450, that is only one way to do this. For example, program instructions can be delivered via bundles during program initiation, so that the very first interrogation of the cache 450 by the scheduler 424 does not result in cache misses.

While various embodiments have been described above, it should be understood that they have been presented by way of example only, and not limitation. The foregoing references to specific number, for example the use of quads are for purposes of explanation and illustration only. Thus, the breadth and scope of a preferred embodiment should not be limited by any of the above described exemplary embodiments, but should be defined only in accordance with the following claims and their equivalents. While the foregoing is directed to embodiments of the present invention, other and further embodiments of the invention may be devised without departing from the basic scope thereof, and the scope thereof is determined by the claims that follow.

The invention claimed is:

1. A shader, for processing rasterized pixel data, comprising:
   a plurality of programmable shader pipelines, each programmable shader pipeline including a texture unit;
   a scheduler operatively coupled to each programmable shader pipeline in said plurality of programmable shader pipelines;
   a fully associative cache memory operatively coupled to said scheduler and each of the plurality of programmable shader pipelines and configured to store programming instructions,
   wherein the scheduler is configured to:
      transmit a first shader programming command that includes a program flag bit to a first texture unit included in a first programmable shader pipeline that causes the first texture unit to retrieve a plurality of programming instructions from a system memory to the cache memory to form a first very long instruction word (VLIW), wherein the first VLIW is for configuring the first programmable shader pipeline, if there are no programming instructions stored in the cache memory for configuring the first shader pipeline as required by the scheduler,
      retrieve a second VLIW stored in the cache memory for configuring the first programmable shader pipeline, if there are programming instructions stored in the cache memory for configuring the first programmable shader pipeline, and convert the programming instructions into the second VLIW; and
      transmit the first or second VLIW from the cache memory to one or more of the programmable shader pipelines in addition to the first pipeline; and
   a gatekeeper associated with each of the programmable shader pipelines and cooperating with the scheduler to transmit a VLIW to the associated programmable shader pipeline followed by a segment to be processed by the associated programmable shader pipeline, whereby the same VLIW is used by one or more programmable shader pipelines to simultaneously process the segment and a different VLIW is simultaneously used by a different one of the programmable shader pipelines to process a different segment.

2. A shader according to claim 1, wherein said cache memory includes a plurality of cacheline registers, each for storing program instructions for a fragment program.

3. A shader as claimed in claim 1 wherein each of the programmable shader pipelines includes a plurality of processing stations and is configured to be programmable by a very long instruction word (VLIW) that comprises N programming instructions, where N is an integer corresponding to a number of instructions stored in a single cacheline and a number of processing stations in one of the pipelines.

4. A shader as claimed in claim 3 wherein the scheduler causes the cache memory to store both the N instructions called by the scheduler and a second set of N instructions comprising the next most likely set of instructions to be called by the pipeline.

5. A graphics processing integrated circuit, comprising:
   a front end for receiving raw graphic data;
   a geometry engine for organizing said raw graphics data into geometric primitives;
   a rasterizer for converting said geometric primitives into rasterized pixel data; and
   a shader for processing rasterized pixel data, comprising:
   a plurality of programmable shader pipelines, each programmable shader pipeline including a texture unit;
   a scheduler operatively coupled to each programmable shader pipeline in said plurality of programmable shader pipelines;
   a fully associative cache memory operatively coupled to said scheduler and each of the plurality of programmable shader pipelines and configured to store programming instructions,
   wherein the scheduler is configured to:
      transmit a first shader programming command that includes a program flag bit to a first texture unit included in a first programmable shader pipeline that causes the first texture unit to retrieve a plurality of programming instructions from a system memory to the cache memory to form a first very long instruction word (VLIW), wherein the first VLIW is are for configuring the first programmable shader pipeline, if there are no programming instructions stored in the cache memory for configuring the first shader pipeline as required by the scheduler, and
      retrieve a second VLIW stored in the cache memory for configuring the first programmable shader pipeline, if there are programming instructions stored in the cache memory for configuring the first programmable shader pipeline, and convert the programming instructions into the second VLIW; and
   transmit the first or second VLIW from the cache memory to one or more of the programmable shader pipelines in addition to the first pipeline; and
   a gatekeeper associated with each of the programmable shader pipelines and cooperating with the scheduler to transmit a VLIW to the associated programmable shader pipeline followed by a segment to be processed by the associated programmable shader pipeline, whereby the same VLIW is used by one or more programmable shader pipelines to simultaneously process the segment and a different VLIW is simultaneously used by a different one of the programmable shader pipelines to process a different segment.

6. A graphics processing integrated circuit according to claim 5, wherein said programmable shader pipelines process pixel data.

7. A graphics processing integrated circuit according to claim 5, wherein each of said programmable shader pipelines is comprised of a plurality of programmable processing stations.

8. A graphics processing integrated circuit according to claim 5, wherein said cache memory includes a plurality of cacheline registers, each for storing program instructions for a fragment program to be applied to one or more shader pipelines of said plurality of shader pipelines.

9. A graphics processing integrated circuit as claimed in claim 5 wherein each of the programmable shader pipelines includes a plurality of processing stations and is configured to be programmable by a very long instruction word (VLIW) that comprises N programming instructions, where N is an integer corresponding to a number of instructions stored in a single cacheline and a number of processing stations in one of the pipelines.

10. A graphics processing integrated circuit as claimed in claim 9 wherein the scheduler causes the cache memory to store both the N instructions called by the scheduler and a second set of N instructions comprising the next most likely set of instructions to be called by the pipeline.

* * * * *

UNITED STATES PATENT AND TRADEMARK OFFICE
CERTIFICATE OF CORRECTION

PATENT NO.        : 7,439,979 B1                                Page 1 of 1
APPLICATION NO.   : 10/985285
DATED             : October 21, 2008
INVENTOR(S)       : Allen et al.

It is certified that error appears in the above-identified patent and that said Letters Patent is hereby corrected as shown below:

On the Title Page, item 75, please replace "Rui M. Bestos" with -- Rui M. Bastos --.

Signed and Sealed this

Twenty-fourth Day of February, 2009

JOHN DOLL
*Acting Director of the United States Patent and Trademark Office*